Apr. 17, 1923.  1,452,340
G. B. N. E. HUBBARD
EDUCATIONAL TOY
Filed Sept. 2, 1920
Fig.1. Fig.2. Fig.3.
Fig.4.
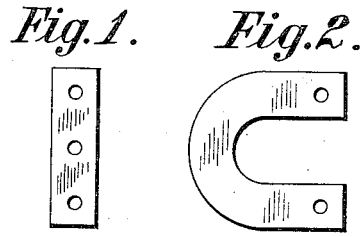
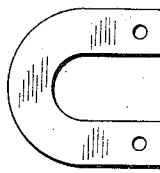
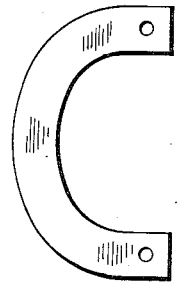
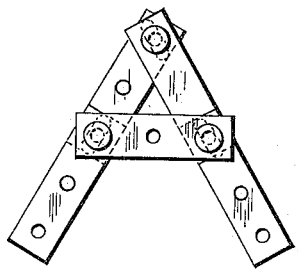
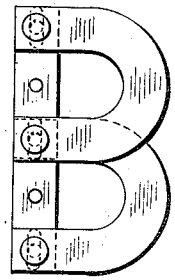
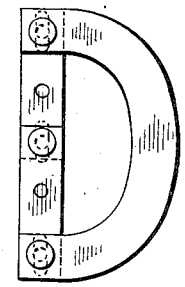
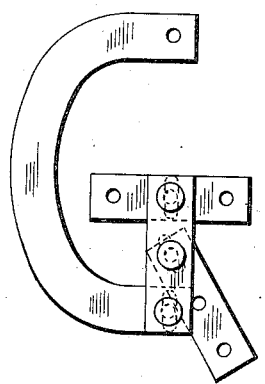
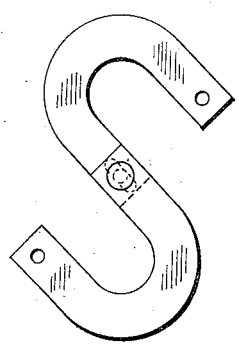
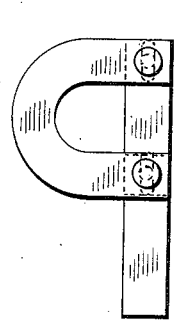
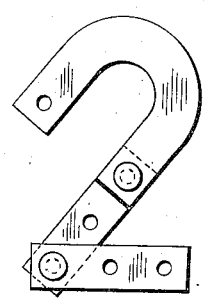
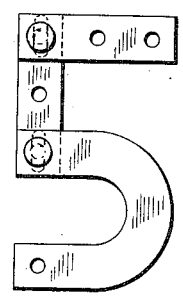
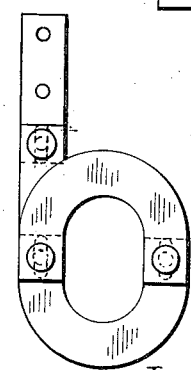
Inventor
Gwendolen B. N. Egerton Hubbard
by Bakewell, Byrnes, Parmelee
her attys Patented Apr. 17, 1923.

1,452,340

UNITED STATES PATENT OFFICE.

GWENDOLEN BEATRICE NORA EGERTON HUBBARD, OF HOLLYWOOD, CALIFORNIA.

EDUCATIONAL TOY.

Application filed September 2, 1920. Serial No. 407,679.

*To all whom it may concern:*

Be it known that I, GWENDOLEN BEATRICE NORA EGERTON HUBBARD, a subject of British Isles, residing at Hollywood, in California, United States of America, have invented certain new and useful Improvements in Educational Toys, of which the following is a specification.

This invention relates to educational toys of the class comprising a number of elements which may be of sheet material for forming characters, such as letters of the alphabet and numerals, the shape of the elements being such that various characters can be formed by selecting and putting together the appropriate elements. Such toys may be used for instructing children in the formation of letters of the alphabet and of numerals, and the primary object of this invention is to provide a toy of the class described comprising a minimum number of elements of different kinds, in order that young children shall not be confused by a multiplicity of elements of different sizes and shapes.

To this end, one form of toy according to the invention comprises multiples of only three types of elements.

Other features of the invention are described hereinafter.

The invention consists in the construction and combination of parts described hereinafter and pointed out in the claims.

In the accompanying drawings,

Figures 1, 2 and 3 indicate the three different types of elements employed, and Figure 4 illustrates various characters formed with such elements.

These elements are made of any sheet material, such as cardboard or metal and that shown in Figure 1 is oblong, being a straight strip of approximately half the length of the straight portion of a letter B of the size intended to be formed by the parts. The curved piece shown in Figure 2 is U-shaped and of such size and shape as to provide the loop for the B and the curved or semi-elliptical piece shown in Figure 3 is C-shaped and of such size as to provide the looped portion of the letter D. All of these parts are perforated, as shown, to enable them to be connected together by paper-fasteners, as shown at X in Fig. 4. When two of the elements shown in Fig. 1 are connected together in overlapping relation, they form a compound oblong element for use as a down stroke or straight portion of a letter B of the size intended to be formed by the parts. As shown in the drawing, each element is of the same width throughout its length and uniform in width with the other elements.

By means of these three elements any letter in the alphabet and any roman or Arabic number can be formed, as shown in Fig. 4. Thus the A is built up of two of said compound oblong elements formed each of two of the elements shown in Figure 1 cross-connected by the element shown in Figure 1. B as illustrated, is built up of a said compound element and two of the elements shown in Figure 2, secured to it side-by-side. The element shown in Figure 3 constitutes C in itself and D is built with one of these elements having a said compound oblong element shown secured across its ends. G is composed of the element shown in Figure 3 and three of the elements shown in Figure 1. S is built up of two of the elements shown in Figure 2 and P with one of the elements shown in Figure 2 and two of the elements shown in Figure 1 connected end to end.

Roman figures can obviously be built up from groupings of the element shown in Figure 1 and require no explanation. Arabic figures can also be built up, and figures 2, 5 and 6 are illustrated in the drawings. The 2 is built of one of the elements shown in Figure 2 and two of those shown in Figure 1. The 5 is composed of the same elements differently arranged, and the 6 is built of two of the elements shown in Figure 2 with their limbs joining one another and a compound oblong element made of two of the elements shown in Fig. 1 connected end to end.

The elements may be coloured, and if desired, the colours may be so arranged that those of one colour when put together will spell the name of the colour, thus the elements required for spelling the word "red" may be coloured red, and so forth.

It will be appreciated that any number of elements of the types illustrated may be provided for a single educational set, according to the number of letters or figures it is desired shall be composed at one and the same time.

It has not been considered necessary to explain how all the letters of the alphabet and all the numerals can be composed, but the examples chosen are sufficient to show how the others can be produced.

What I claim as my invention and desire to secure by Letters Patent is:—

1. A toy of the character described, consisting of multiples of only three types of elements, whereof one is oblong, a second is U-shaped, and a third is C-shaped, and the oblong elements are all of the length required for half the length of a straight portion of a letter B of the size to be made with the toy, and the U-shaped and C-shaped elements are dimensioned and proportioned, the former all so that each will constitute one arch of the said letter B and the latter all so that each will constitute the arch of a letter D of a size corresponding to the said letter B, the terminal portions of all of said elements being provided with perforations whereby the elements in the built up letters may be secured together in overlapping relation, substantially as described.

2. A toy of the character described, consisting of multiples of only three types of elements, whereof one is oblong, a second is U-shaped, and a third is C-shaped, and the oblong elements are all of the length required for half the length of a straight portion of a letter B of the size to be made with the toy, and the U-shaped and C-shaped elements are dimensioned and proportioned, the former all so that each will constitute one arch of the said letter B and the latter all so that each will constitute the arch of a letter D of a size corresponding to the said letter B, each element being of uniform width throughout its length and the same width as each of the other elements, the terminal portions of all of said elements being provided with perforations whereby the elements in the built up letters may be secured together in overlapping relation, substantially as described.

In testimony whereof I affix my signature.

GWENDOLEN BEATRICE NORA EGERTON HUBBARD.